United States Patent [19]

Hawsey et al.

[11] Patent Number: 4,996,457
[45] Date of Patent: Feb. 26, 1991

[54] ULTRA-HIGH SPEED PERMANENT MAGNET AXIAL GAP ALTERNATOR WITH MULTIPLE STATORS

[75] Inventors: Robert A. Hawsey, Oak Ridge; J. Milton Bailey, Knoxville, both of Tenn.

[73] Assignee: The United States of America as represented by the United States Department of Energy, Washington, D.C.

[21] Appl. No.: 500,353

[22] Filed: Mar. 28, 1990

[51] Int. Cl.$^5$ .................. H02K 1/28; H02K 21/24
[52] U.S. Cl. .................. 310/268; 310/112; 310/156
[58] Field of Search .......... 310/43, 46, 112, 154, 310/156, 208, 268

[56] References Cited

U.S. PATENT DOCUMENTS

| 4,104,552 | 8/1978 | Tsergas | 310/156 |
|---|---|---|---|
| 4,464,592 | 8/1984 | Major | 310/112 |
| 4,578,610 | 3/1986 | Kliman et al. | 310/268 |
| 4,634,912 | 1/1987 | Heyraud | 310/268 |
| 4,761,590 | 8/1988 | Kaszman | 310/156 |
| 4,866,321 | 9/1989 | Blanchard | 310/112 |

FOREIGN PATENT DOCUMENTS 3026339 2/1982 Fed. Rep. of Germany ...... 310/156

Primary Examiner—Steven L. Stephan
Assistant Examiner—D. L. Rebsch
Attorney, Agent, or Firm—David E. Breeden; Stephen D. Hamel; William R. Moser

[57] ABSTRACT

An ultra-high speed, axial gap alternator that can provide an output to a plurality of loads, the alternator providing magnetic isolation such that operating conditions in one load will not affect operating conditions of another load. This improved alternator uses a rotor member disposed between a pair of stator members, with magnets disposed in each of the rotor member surfaces facing the stator members. The magnets in one surface of the rotor member, which alternate in polarity, are isolated from the magnets in the other surface of the rotor member by a disk of magnetic material disposed between the two sets of magents. In the preferred embodiment, this disk of magnetic material is laminated between two layers of non-magnetic material that support the magnets, and the magnetic material has a peripheral rim that extends to both surfaces of the rotor member to enhance the structural integrity. The stator members are substantially conventional in construction in that equally-spaced and radially-oriented slots are provided, and winding members are laid in these slots. A unit with multiple rotor members and stator members is also described.

19 Claims, 4 Drawing Sheets

ULTRA-HIGH SPEED PERMANENT MAGNET AXIAL GAP ALTERNATOR WITH MULTIPLE STATORS

FIELD OF INVENTION

This invention was made as a result of work under Contract No. DE-AC05-84OR21400 between Martin Marietta Energy Systems, Inc., and the U.S. Department of Energy. It relates generally to permanent magnet generators, and more particularly to axial-gap, high-speed alternators of this type having multiple stators wherein the stators are magnetically isolated from each other so that each can supply different loads without being affected by the conditions in the different loads.

BACKGROUND ART

Alternators for use in the electrical art are most often of the radial-gap type wherein a rotor mounted on a rotatable shaft is positioned within a generally cylindrical housing containing a winding or windings. The rotor carries permanent magnets and, when the rotor is caused to rotate on the axis of the machine, a voltage is generated in the surrounding winding unit. In another version of the radial-gap alternator, the rotor carries the windings and the magnets are positioned within the surrounding stator. In this construction, slip rings are required to take the induced voltage from the rotor.

The above-described radial-gap alternators can be rather large when it is desired to produce relatively high voltages/currents. Accordingly, they are expensive to construct and they must be driven by rather sizeable motors. Often the particular application dictates small size; therefore, these radial-gap alternators are not suitable.

Another type of alternator that has been shown to have advantages, particularly for producing a relatively high horsepower in small sizes, is that referred to as axial-gap alternators. In these devices, a disk-type rotor is positioned proximate a fixed disk-type stator (or a pair of stators, one on each side of the rotor). Permanent magnets are imbedded in the rotor such that as it is rotated by a motor, for example, voltages are generated within the stator. This type of device eliminates the need for slip-rings, and can be operated at substantially higher rotational speeds. Since the horsepower output is related to speed of rotation, this higher rotational speed generates a higher horsepower for a given size machine. Typically the rotational speed is several thousand RPM (e.g., 15,000)

Several axial-gap permanent magnet machines have been disclosed in the prior art. One such machine is described and claimed in U.S. Pat. No. 4,358,693 issued to D. L. Palmer, et al, on Nov. 9, 1982. This device is a magnetic motor having a plurality of stators with a plurality of rotors (preferably one more rotor than stator). The rotors contain a plurality of permanent magnets with their poles alternating in polarity. The windings on each stator are arranged in two sets, and a distributor cycles current to the sets so that each set reverses polarity each successive time it is charged. The construction permits the use of both poles of the magnets to provide driving forces.

Another of the prior art axial-gap devices is described and claimed in U.S. Pat. No. 4,371,801 issued to E. Richter on Feb. 1, 1983. In this device rotor disks support permanent magnets oriented to direct flux axially through the machine, and multiple stator disks are provided having distributed multi-phase windings. Means are provided to rotate one of the stator disks (relative to the other stator disks) to cause misalignment of windings on adjacent disks having the same phase. By controlling the degree of phase misalignment, the output voltage of a generator (or power factor of a motor) may be controlled.

Although the '801 device has a plurality of stators, there is no discussion of using the different stators to drive individual loads. However, even if one should attempt to accomplish the supply to different loads, magnetic fluctuations coupled from one load upon the generator would affect the voltage being supplied to the other load(s). For example, if one load is cycled off and on regularly (or irregularly), the voltage/current impulses produced by the same would be sensed in all of the stators of the machine. Such impulses, due to changes in the magnetic loading of the common magnetic material, often would be detrimental to loads being energized from those other stators. This effect would be observed using other known multiple stator machines.

Other typical references that are deemed to be related to this art are U.S. Pat. Nos. 3,428,840 issued to W. Kober on Feb. 18, 1969; 4,394,594 issued to F. Schmider on July 19, 1983; and 4,605,874 issued to E. Whitely on Aug. 12, 1986. None of these references teach the idea of connecting the different stators to separate loads and/or the isolating of different loads if so connected.

Accordingly, it is an object of the present invention to provide an axial gap generator having a plurality of magnetically-isolated stators wherein each of said stators can be used to power different loads without the conditions of one load affecting performance of other loads.

It is another object of the present invention to provide a high speed axial gap generator having at least one rotor interposed between two stators, the rotor having spaced-apart permanent magnets on each surface of the rotor to thereby face the stators whereby each of the stators can provide power to independent loads, with a magnetic barrier between the layers of magnets of the rotor so as to magnetically isolate each stator and thus electrically isolate each load.

A further object of the present invention is to provide a high speed axial gap generator having a plurality (N in number) of spaced-apart disk-type rotors mounted on a rotatable shaft, with these rotors interposed between a plurality of disk-type stators (at least N+1 in number), with each of the rotors having spaced-apart permanent magnets on each surface facing the stators, with a magnetic barrier between the layers of magnets of each rotor so as to magnetically isolate the stators and thus electrically isolate any loads supplied by those stators.

These and other objects of the present invention will become apparent upon a consideration of the drawings identified hereinafter, and their complete description.

SUMMARY OF INVENTION

In accordance with the present invention, there is provided an axial-gap alternator that can be operated at high speeds and, in the preferred form, supply more than one load. In the simplest form, there is a disk-type rotor interposed between a pair of disk-type stators, with the rotor being rotated by any suitable means. The rotor has a plurality of permanent magnets imbedded in opposite surfaces that face the two stators such that each set of magnets produces voltages in the confronting stators. A magnetic isolator within the rotor isolates each set of magnets from the other set, and thus isolates each stator, so that operation of the load connected to one stator does not affect any operation in the load connected to the other stator.

DETAILED DESCRIPTION OF THE INVENTION

Figure 1:
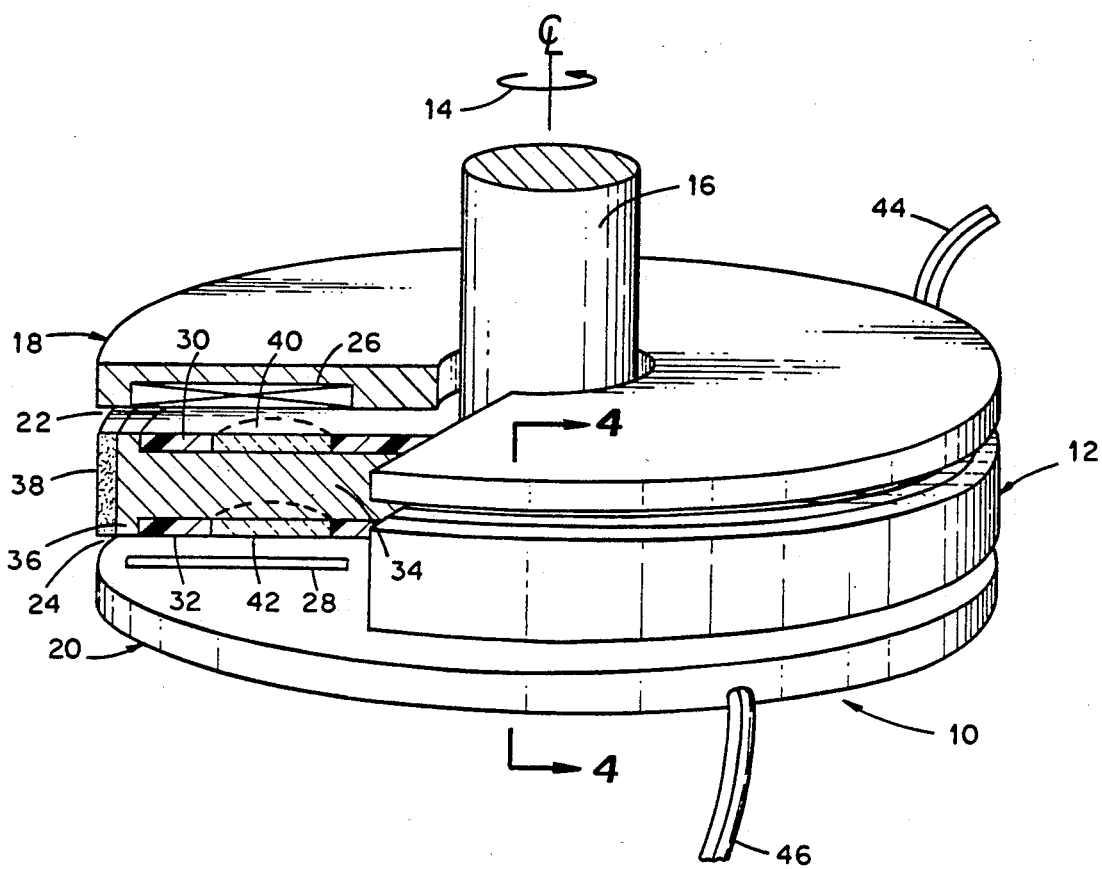
FIG. 1 is an isometric drawing of an illustration of the alternator of the present design, partially cut-away, to show the magnetic isolation between sets of magnets for the purpose of isolating the loads connected to the stators of the machine.

An illustration of an alternator embodying the principles of the present invention is depicted at 10 in FIG. 1. It should be understood that in this FIG. 1, as well as the other figures, there has been no attempt to illustrate the components with any specific size and spacing relationship. Rather, the components have been drawn to more clearly show specific details thereof. In this embodiment, there is a single rotor 12 that is turned in a direction indicated by the arrow 14 through suitable drive means. This drive means includes a shaft 16 which is suitably journaled in bearings (not shown). The rotor 12 is fixedly attached to this shaft by any suitable means which would include, for example, complementary spline components, thermally-accomplished interference fit, etc. Through the use of the drive means, the rotor is typically rotated at 5000 to 15,000 RPM, although other speeds can be utilized with this generator.

The rotor 12 is interposed between two stator members 18, 20 as shown. Typically, these stators are fabricated from tape-wound silicon steel. The spacing between the rotor and the stators, as identified by the gaps 22, 24, is very small; e.g., 0.020 in. As discussed in greater detail hereinafter, the stator 18 has a plurality of radially-oriented slots containing winding members 26, with a group of these winding members associated with a single pole of the machine. Typically, these winding members are fabricated using insulated copper wires. In a similar manner, the stator 20 has a plurality of radially-oriented winding members 28 (only one shown) in slots. The winding members 28 can be identical with those associated with the stator 18, or there can be a different number of wires in the winding members. The number will depend upon the particular load that is to be driven by the two stators 18, 20.

The particular construction of the rotor 12 is the heart of the present invention. The body of the rotor is made up of three axially-positioned disks, the outer two disks 30, 32 are fabricated from non-magnetic material, e.g., plastic, aluminum, etc.. The center disk 34 is fabricated from a magnetic material, such as managing steel, magnetic iron alloys, etc. This center disk typically is from 0.25 to 0.50 in. thick. Preferably, this center disk terminates in a rim 36 as illustrated to add structural integrity. In order to prevent damage to the rotor due to centrifugal forces, the rotor is typically provided with a restraining band 38 fabricated from, for example, fibers contained in a suitable matrix. These fibers can be, for example, carbon fibers in a matrix such as will be known by persons skilled in the art.

The disk 28 is provided with a plurality of recesses to accept an even number of flat magnets 40. Although preferably round in cross-section, i.e., being cylindrical, these magnets could have other configurations. Typically, these magnets 40 are ceramic-type (e.g., Nd:Fe:B), having a thickness of about 0.25 in. and a diameter of 0.75 to 1.25 in. All the magnets in this disk are oriented to have alternating polarities at the surface of the disk and thus alternating polarities where they are in substantial contact with the disk 34 of magnetic material. Thus, each pair of the magnets produce a magnetic circuit through the disk 34. When the wires of the aforementioned winding members pass through this magnetic circuit, a voltage is induced in the winding members. In a similar manner, the disk 30 is provided with a plurality of recesses to accept an even number of flat magnets 42. These would be of the same type as used for the magnets 40. All of these magnets 42 will be oriented to have alternating polarities; however, their polarities will be opposite the polarities of the magnets immediately across the disk 34 (if there are equal numbers of magnets on each side). While it is preferable that the magnets 42 are identical in number, size and spacing as magnets 40, some difference could be tolerated; however, the various components must maintain balance to the rotor 12. The outputs of the stators will appear on the cables 44, 46, respectively.

Although not shown in FIG. 1, it will be understood by those versed in the art that there will be a general housing surrounding the rotor/stator components. This general housing would contain, for example, the bearing means required for supporting the shaft 16. Furthermore, since considerable power will be generated, conventional cooling means (not shown) will be utilized within that general housing and/or in contact with the exposed surfaces of the stator elements 18, 20.

Figure 2:
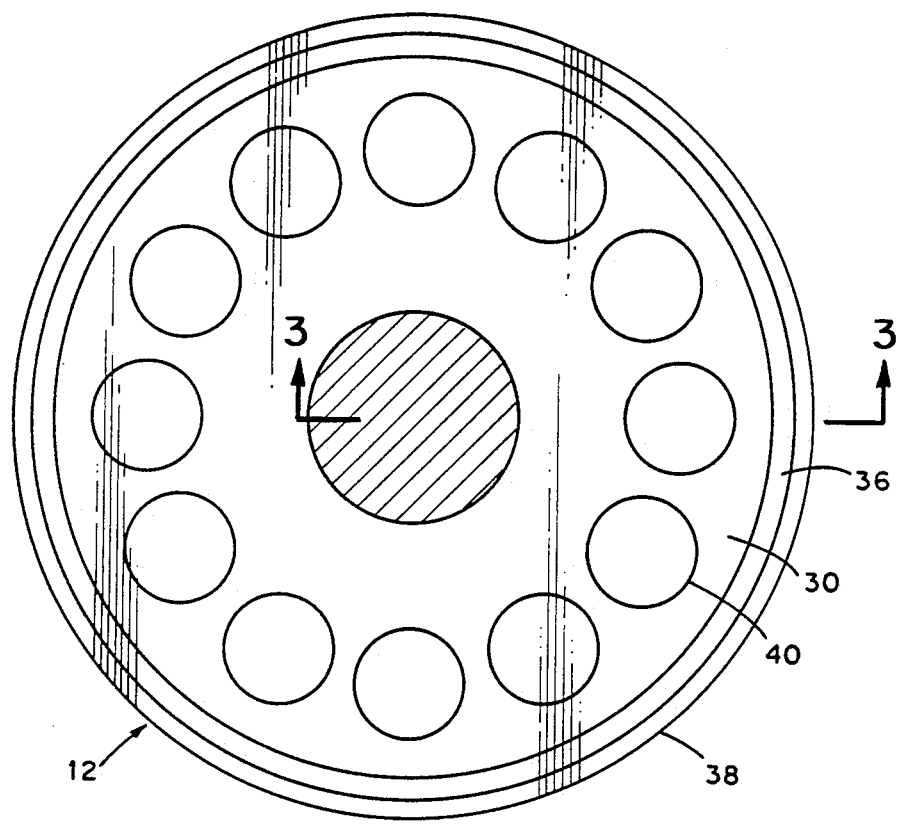
FIG. 2 is a top view of the rotor of the alternator illustrated in FIG. 1.

The arrangement of the magnets 40 in the rotor 12 is depicted in the top view of the rotor as illustrated in FIG. 2. It can be seen that all of the magnets 40 are positioned at a given radius from the center, and are equally spaced around the rotor 12. Each magnet forms a part of a single pole of the alternator.

Figure 3:
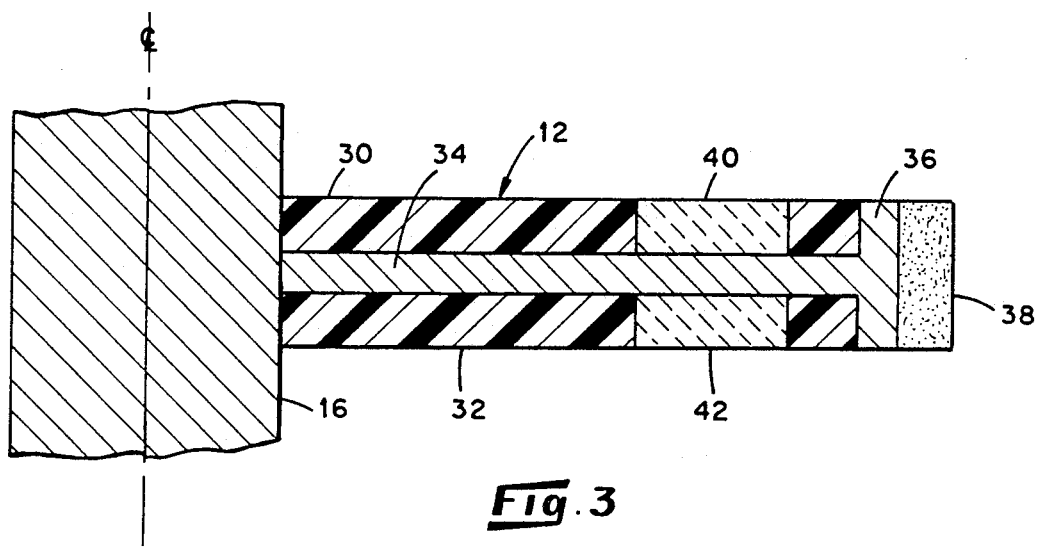
FIG. 3 is a cross-sectional drawing, partially cut-away, of the rotor of FIG. 2 taken at 3—3 thereof.

A slightly enlarged cross-section of one half of the rotor 12 is shown in FIG. 3. This shows the "sandwich" construction of the two non-magnetic disks 30, 32 and the magnetic disk 34 with its peripheral rim 36. These disks 30, 32 and 34 are laminated using any suitable means. For example, they may be glued with a suitable cement, joined by brazing, etc. This drawing further illustrates that each magnet (either 40 or 42) extends substantially from the surface of the rotor 12 to the disk 34 so as to create the optimum magnetic circuit.

Figure 4:
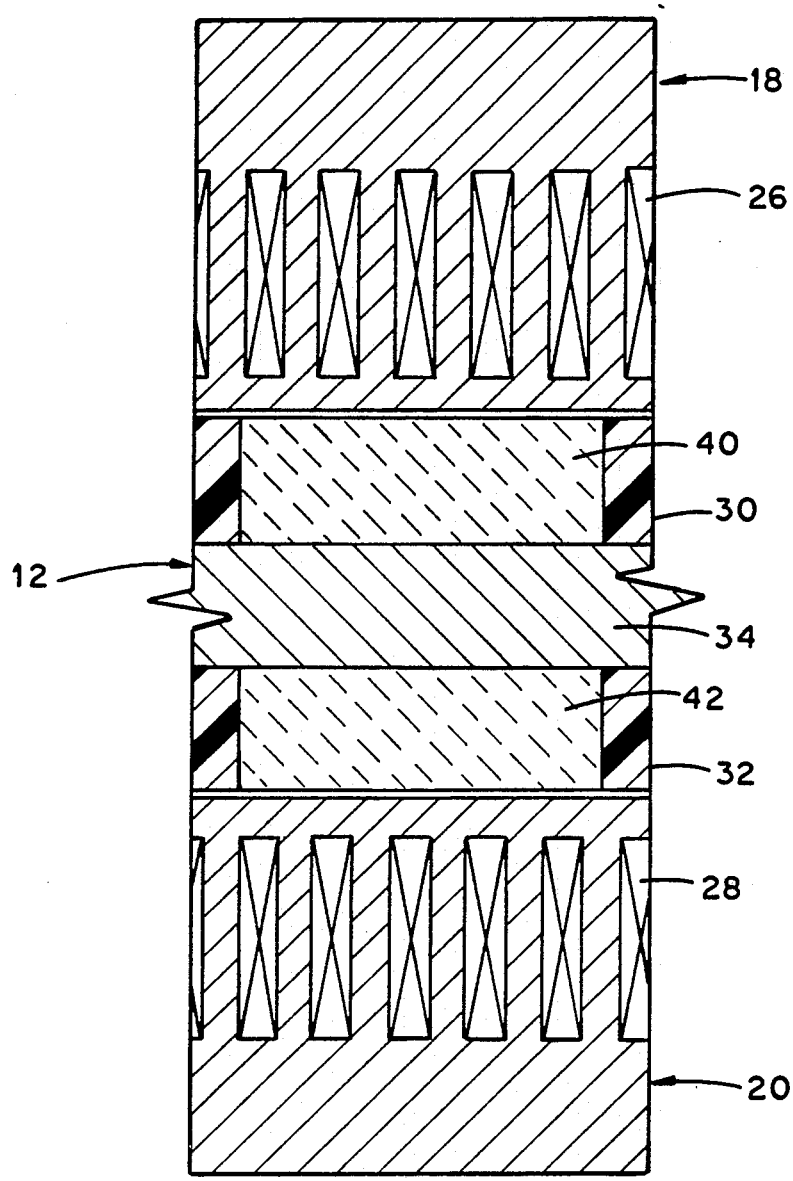
FIG. 4 is a partial cross-section of the alternator of FIG. 1 taken at 4—4 of FIG. 1 illustrating one pole of the present invention.

A cross-section of a single pole of the alternator of the present design is shown in FIG. 4. This cross-section is taken at 4—4 of FIG. 1. It can be seen that several winding members 26 within the stator 18 are in the influence of the magnetic field produced by the magnet 40 as the rotor 12 revolves. At the same time, several of the winding members 28 in the stator 20 are in the influence of magnet 42. Thus, as the rotor 12 revolves, voltages are induced in the two stators. The particular voltage generated in each stator is proportional to the number of wires in each winding member of that stator. The power produced in each stator can be determined from the approximate equation:

$$P \sim BliNR$$

where B is the air gap flux density; l is the diameter of the magnet; i is the current; N is the number of wires in a slot; and R is the average radius of the magnet.

The horsepower, HP, of the unit can be determined from the approximate equation:

$$HP = \frac{2\pi ST}{33,000}$$

where S is the rotational speed in RPM and T is in lb.ft.

Figure 5:
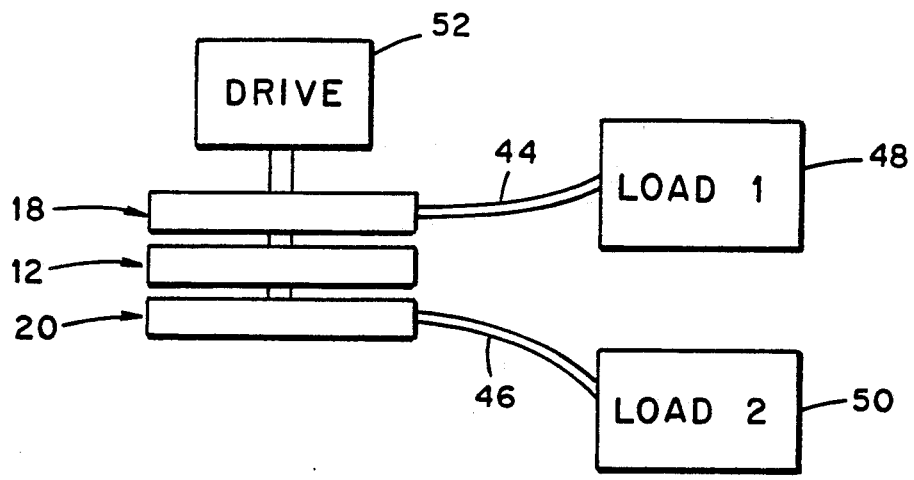
FIG. 5 is a schematic diagram illustrating the use of the alternator of FIG. 1 for supplying two separate loads.

FIG. 5 is a schematic diagram illustrating that the device of FIG. 1 can be utilized to provide power to two loads 48, 50 by the leads 44, 46. The loads can include appropriate power regulation electronics if desired or required. Either of these loads, or both, could produce fluctuating signals that would appear at the stators; however, due to the magnetic isolation described above, these fluctuating signals due to one load will not affect the power being fed to the other load. This figure also illustrates a drive means 52 used to drive the rotor 12.

Figure 6:
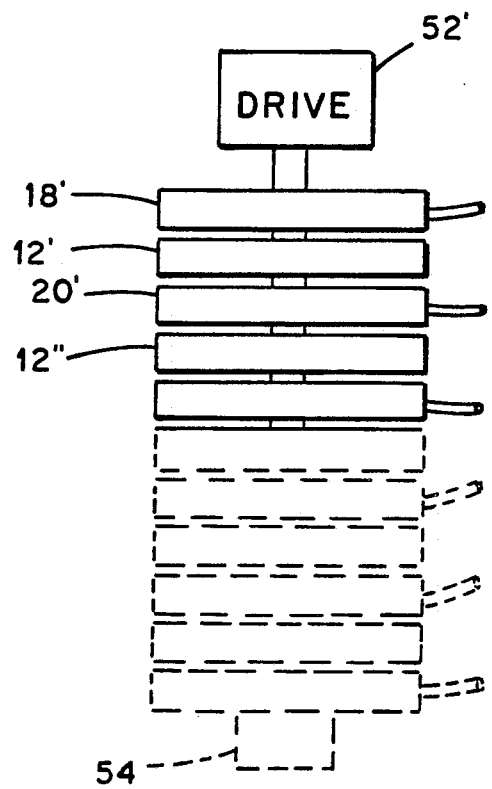
FIG. 6 is a schematic diagram illustrating that the principles of the present invention can be applied to an alternator having a plurality of stators and rotors.

Another schematic diagram related to the present invention is shown in FIG. 6. This depicts the use of a plurality of stators and rotors commonly driven by drive means 52'. With this construction, a plurality of loads can be provided with power, with magnetic isolation between stator providing isolation between loads. The stators and rotors can be alternated for some applications; however, for other applications the construction can include multiple units each having a single rotor sandwiched between a pair of stators. When several units are fabricated together as illustrated, a separate outboard bearing unit 54 may be required to provide stability to the drive shaft.

From the foregoing, it will be understood that there is provided an improved axial-gap machine that is designed primarily as an alternator to provide power to more than one load. The device isolates the circuits to the loads via magnetic isolation to prevent conditions within one load from influencing conditions in the other loads. At the same time, it provides the various advantages of an ultra high-speed permanent magnet machine. Of course, the device can be used to supply a single load. The specific materials and sizes given herein are for illustrative purposes only, and are not for any limitation of the invention. Rather, the invention is to be limited only by the appended claims and their equivalents when read together with the detailed description of the invention.

We claim:

1. An ultra-high speed, permanent magnet, axial-gap alternator for supplying a load, which comprises:
    a rotatable shaft having an axis;
    means for rotating said shaft around said axis at a selected speed;
    a disk-type rotor member fixedly attached to said shaft so as to rotate with said shaft, said rotor member having first and further parallel surfaces perpendicular to said axis, said rotor member fabricated from laminated disk-type layers having
        a. a central disk-shaped layer of a magnetic material extending from proximate said shaft to a peripheral edge,
        b. a first layer of a non-magnetic material joined to a first surface of said central layer, said first layer of non-magnetic material defining said first surface of said rotor member,
        c. a second layer of non-magnetic material joined to a second surface of said central layer, said second layer of non-magnetic material defining said second surface of said rotor member,
        d. a first set of an even number of magnets positioned within said first layer of non-magnetic material and arranged at a first common radius from said shaft, said magnets of said first set extending substantially from said first surface of said rotor member to said central layer of said rotor member, and
        e. a second set of an even number of magnets positioned within said second layer of non-magnetic material and arranged at a second common radius from said shaft, said magnets of said second set extending substantially from said further surface of said rotor member to said central layer of said rotor member;
    a first disk-type stator member positioned at close proximity to said first surface of said rotor member, said first stator member having a surface, facing said first surface of said rotor member, provided with equally-spaced radially extending slots, said slots containing winding members each electrically connected to a first output cable for said first stator member to connect said first stator member to a load; and
    a second disk-type stator member positioned at close proximity to said further surface of said rotor member, said second stator member having a surface, facing said further surface of said rotor, provided with equally-spaced radially extending slots, said slots containing winding members each electrically connected to a second output cable for said second stator member to connect said second stator member to a load.

2. The alternator of claim 1 wherein said central disk of magnetic material is provided with a rim, said rim extending from said first surface to said further surface of said rotor member.

3. The alternator of claim 2 further comprising a constraining band surrounding said rim at said peripheral edge of said rotor member.

4. The alternator of claim 1 wherein:
    said magnets of said first set are cylindrical in shape and are oriented to provide alternating polarities; and
    said magnets of second set are cylindrical in shape and oriented to provide alternating polarities, said polarities of said second set of magnets being opposite said polarities of said first set of magnets across said central layer of said rotor member.

5. The alternator of claim 4 wherein magnets of said first and second set are ceramic rare earth magnets.

6. The alternator of claim 5 wherein said magnets of said first and second set are fabricated from a Nd-Fe-B alloy.

7. The alternator of claim 4 wherein said magnets of said first and second set are about 0.75 to about 1.25 inch in diameter and about 0.25 thick.

8. The alternator of claim 1 wherein said central magnetic disk of said rotor member is an iron-containing material, and said first and second non-magnetic disks are fabricated from aluminum.

9. The alternator of claim 1 wherein said central magnetic disk of said rotor member is an iron-containing material, and said first and second non-magnetic disks are fabricated from a plastic.

10. The alternator of claim 1 wherein said central magnetic disk of said rotor member has a thickness of about 0.25 to about 0.50 inch, and said first and second non-magnetic disks have a thickness of about 0.25 inch.

11. The alternator of claim 1 wherein said load connected to said first stator member is distinct from said load connected to said second stator member.

12. The alternator of claim 1 wherein said load connected to said first stator member is said load connected to said second stator member.

13. An ultra-high speed, permanent magnet, axial-gap alternator for supplying at least two loads, which comprises:
   a rotatable shaft having an axis;
   means for rotating said shaft around said axis at a selected speed;
   a disk-type rotor member fixedly attached to said shaft so as to rotate with said shaft, said rotor member having first and further parallel surfaces perpendicular to said axis, said rotor member fabricated from laminated disk-type layers having
   a. a central disk-shaped layer of a magnetic material extending from proximate said shaft to a peripheral edge, said central layer terminating at said peripheral edge in a rim that extends from said first to said further surfaces of said rotor member,
   b. a first layer of a non-magnetic material joined to a first surface of said central layer, said first layer of non-magnetic material defining said first surface of said rotor member,
   c. a second layer of non-magnetic material joined to a second surface of said central layer, said second layer of non-magnetic material defining said second surface of said rotor member,
   d. a first set of an equal number of cylindrically-shaped magnets positioned within said first layer of non-magnetic material and arranged at a first common radius from said shaft, said magnets of said first set extending substantially from said first surface of said rotor member to said central layer of said rotor member and oriented to have alternating polarities, and
   e. a second set of an equal number of cylindrically-shaped magnets positioned within said second layer of non-magnetic material and arranged at a second common radius from said shaft, said magnets of said second set extending substantially from said further surface of said rotor member to said central layer of said rotor and oriented to have alternating polarities opposite said polarities of said first set of magnets across said central layer of said rotor member;
   a first disk-type stator member positioned at close proximity to said first surface of said rotor member, said first stator member having a surface, facing said first surface of said rotor member, provided with equally-spaced radially extending slots, said slots containing winding members each electrically connected to a first output cable for said first stator member to connect said first stator member to a first load; and
   a second disk-type stator member positioned at close proximity to said further surface of said rotor member, said second stator member having a surface, facing said further surface of said rotor, provided with equally-spaced radially extending slots, said slots containing winding members each electrically connected to an output cable for said second stator member to connect said second stator member to a second load.

14. The alternator of claim 13 further comprising a constraining band surrounding said rim at said peripheral edge of said rotor member.

15. The alternator of claim 13 wherein magnets of said first and second set are ceramic rare earth magnets.

16. The alternator of claim 13 wherein said magnets of said first and second set are about 0.75 to about 1.25 inch in diameter and about 0.25 thick.

17. The alternator of claim 13 wherein said central magnetic disk of said rotor member is iron having a thickness of about 0.25 to 0.50 inch, and said first and second nonmagnetic disks are fabricated from aluminum having a thickness of about 0.25 inch.

18. An ultra-high speed, permanent magnet, axial-gap alternator for supplying at least two loads, which comprises:
   a rotatable shaft having an axis;
   means for rotating said shaft around said axis at a selected speed;
   a disk-type rotor member fixedly attached to said shaft so as to rotate with said shaft, said rotor member having first and further parallel surfaces perpendicular to said axis, said rotor member fabricated from laminated disk-type layers having
   a. a central disk-shaped layer of a magnetic iron-containing material extending from proximate said shaft to a peripheral edge, said central layer terminating at said peripheral edge in a rim that extends from said first to said further surfaces of said rotor member,
   b. a first layer of a non-magnetic material joined to a first surface of said central layer, said first layer of non-magnetic material defining said first surface of said rotor member,
   c. a second layer of a non-magnetic material joined to a second surface of said central layer, said second layer of non-magnetic material defining said second surface of said rotor member,
   d. a first set of an equal number of cylindrically-shaped ceramic magnets positioned within said first layer of non-magnetic material and arranged at a first common radius from said shaft, said magnets of said first set extending substantially from said first surface of said rotor member to said central layer of said rotor member and oriented to have alternating polarities, and
   e. a second set of non-magnetic material cylindrically-shaped ceramic magnets positioned within said second layer of aluminum and arranged at a second common radius from said shaft, said magnets of said second set extending substantially from said further surface of said rotor member to said central layer of said rotor and oriented to have alternating polarities opposite said polarities of said first set of magnets across said central layer of said rotor member;

a first disk-type stator member positioned at close proximity to said first surface of said rotor member, said first stator member having a surface, facing said first surface of said rotor member, provided with equally-spaced radially extending slots, said slots containing winding members each electrically connected to a first output cable for said first stator member to connect said first stator member to a first load; and a second disk-type stator member positioned at close proximity to said further surface of said rotor member, said second stator member having a surface, facing said further surface of said rotor, provided with equally-spaced radially extending slots, said slots containing winding members each electrically connected to a second output cable for said second stator member to connect said second stator member to a second load.

19. The alternator of claim 18 wherein said central layer of said rotor member is about 0.25 to about 0.50 inch thick, said first and second layers of non-magnetic material are about 0.25 inch thick, and said magnets have a diameter of about 0.75 to about 1.25 inch.

* * * * *